Patented Jan. 17, 1933

1,894,508

UNITED STATES PATENT OFFICE

HENRI LOUIS BARTHELEMY, OF MILAN, ITALY, ASSIGNOR TO RUTH ALDO COMPANY (INC.), OF NEW YORK, N. Y., A CORPORATION OF NEW YORK

METHOD OF ABSORBING AND RECOVERING VAPORS OF VOLATILE LIQUIDS

No Drawing. Application filed July 28, 1927, Serial No. 209,165, and in France December 28, 1926.

It is well known that the quantity of a gas absorbed by a liquid with which it is in contact depends upon the surface area of the absorbent liquid. In order to obtain a maximum of absorption it is therefore necessary to increase the exposed liquid surface of the absorbent body to the maximum. Numerous inventors have attempted to attain this result by using solid bodies presenting the largest possible surface in relation to their volume, such as Raschig rings, Bregeat rings and the like, for packing absorption towers, through which the liquid chosen as absorbent is allowed to trickle.

However, it has been found possible to increase the superficial area of liquids in a far more convenient and more extensive degree by utilizing the phenomena of surface tension; and this constitutes the object of the present invention. It is well known that when a substance which considerably reduces the surface tension is introduced into a liquid, for instance water, the water acquires the property of foaming when agitated with or when traversed by a current of gas. This can be observed when amyl alcohol, saponine, egg albumin, ammonium oleate, potassium stearate, sodium, soaps, and the like, are added to water.

Such masses of foam present a superficial area far larger than any solid tower packings whatsoever, and they also effect an extremely fine distribution of the absorption liquid, by reason of the tenuity of the walls of the foam bubbles. All that is necessary, therefore, is to blow the gases, charged with the vapors to be recovered, through such solutions, which may be contained either in pans fitted with stirring mechanism or in towers provided with metal grids, or any other perforated devices adapted to catch the foam and thus bring about an intimate contact between solution and gas.

It has also been ascertained that under certain conditions the results may be still further improved by emulsifying in the foaming liquid an oil or even a solid fatty body since, as is well known, such agents tenaciously retain substances such as benzine, toluol, light hydrocarbons and the like. It is, furthermore, possible to add to the foaming liquid a miscible tensio-active body of high boiling point which will change the surface tension, such for instance as glycerine. It will, however, be understood that the invention is by no means limited to these two groups of bodies.

The efficiency of the improved method is based entirely upon the formation of foam. In fact, according to Gibbs' law: "if a substance which is dissolved in a liquid reduces the surface tension of that liquid, the concentration of this substance in the superficial layer is greater than in the mass of the liquid, or in other words, the variation of concentration at the surface is positive."

It will be readily understood that the process of recuperation may be rendered continuous, for instance, by allowing the absorption liquid to flow in the opposite direction to the current of gas under treatment, whereupon the absorption liquid, in turn, is freed from the contained solvent by heating in a system of pipes or in any other suitable apparatus. At this moment the foam must, of course, be got rid of by known means, because it would interfere with the operation of the distilling apparatus.

*Example*

An acetone-air mixture which contains 45 g. of acetone vapor per cubic meter of air is introduced into the perforated false bottom forming the base of an absorption tower filled with foam which latter is supported on a series of metal gratings in the shape of domed discs. The foam is obtained by agitating a liquid composed of:

| | Parts |
|---|---|
| Water | 1000 |
| Ammonium oleate | 45 |
| Commercial glycerine | 50 |

The circulation of the current of gas takes place on the counterflow principle in relation to the foaming absorption liquid.

The liquid charged with acetone collecting in the lower portion of the apparatus is conducted into a column still and used again after cooling.

Excellent results have been attained by combining the absorbent action of the foam with the regulation and maintenance of different temperatures in different parts of the absorption apparatus, and utilizing the special action of the heat upon the production and maintenance of the foam, and the influence of cold, to increase the absorption capacity of the foam.

Since the vapor may be taken up by a liquid or very finely divided solid in the foam in various ways, such as solution, absorption, adsorption or intermixture, the references in the claims to absorption are intended to cover all phenomena whereby the vapor is taken up by the foam.

I claim:

1. A process for recovering a substance in vapor form by absorption of the vapor in a constituent of foam, in which the vapor is brought into contact with a foam including a base liquid and an absorbent for the vapor dispersed by emulsification throughout said liquid.

2. A process for recovering a substance in vapor form by absorption of the vapor in a liquid constituent of foam, in which the vapor is brought into contact with a foam including water and an oil capable of absorbing said vapor and emulsified in the water.

3. A process for recovering a substance in vapor form by absorption of the vapor in a constituent of foam, in which the vapor is brought into contact with a foam including a base liquid, an ingredient combined therewith adapted to reduce the interfacial tension between the foam and the vapor, and a material capable of absorbing the vapor dispersed in said liquid.

4. A process for recovering acetone in vapor form by absorption in water carried by a foam, in which the acetone vapor is brought into contact with a foam including water and an ingredient combined therewith adapted to reduce the interfacial tension between the water and the acetone vapor.

5. A process as set forth in claim 4, in which the foam contains an ingredient inert toward acetone and adapted to increase the persistence of the foam.

6. A process as set forth in claim 4, in which the foam contains glycerine.

7. A process for selectively recovering a substance in vapor form from other gases by absorption of the vapor in a constituent of foam, in which the vapor is brought into contact with a foam including a base liquid and an ingredient combined therewith adapted to reduce the interfacial tension between the foam and the vapor, one of the constituents of the foam being an absorbent of the vapor, and recovering said substance from the constituents of the foam by distillation.

8. A process for selectively recovering a substance in vapor form from other gases by absorption of the vapor in a liquid constituent of foam, in which the vapor is brought into contact with a foam including a base liquid and an ingredient combined therewith adapted to reduce the interfacial tension between the foam and the vapor, one of the constituents of the foam being an absorbent of the vapor; breaking down the foam to produce a liquid carrying said substance, and recovering the substance therefrom by distillation.

9. A cyclic process for recovering a substance in vapor form by absorption in a liquid constituent of foam, in which the vapor is brought into contact with a foam including a base liquid and an ingredient combined therewith adapted to reduce the interfacial tension between the foam and the vapor, one of the constituents of the foam being an absorbent of the vapor; breaking down the foam to form a liquid containing said substance, extracting the substance from said liquid, and regenerating from the liquid a foam for the extraction of further amounts of said substance in vapor form.

In testimony whereof I affix my signature.

HENRI LOUIS BARTHELEMY.